(12) United States Patent
Uth

(10) Patent No.: US 6,494,458 B2
(45) Date of Patent: Dec. 17, 2002

(54) ROTARY SEALING ASSEMBLY

(76) Inventor: Karl E. Uth, 3405 Budleigh Dr., Hacienda Heights, CA (US) 91745

( * ) Notice: Subject to any disclaimer, the term of this patent is extended or adjusted under 35 U.S.C. 154(b) by 0 days.

(21) Appl. No.: 09/750,623

(22) Filed: Dec. 19, 2000

(65) Prior Publication Data

US 2002/0074731 A1 Jun. 20, 2002

(51) Int. Cl.[7] .............................. F16J 15/34; F16J 15/16
(52) U.S. Cl. ...................... 277/358; 277/345; 277/370; 277/399; 277/408
(58) Field of Search .................. 277/358, 359, 277/360, 361, 366, 367, 368, 369, 370, 408, 345, 346, 348, 350, 352, 354

(56) References Cited

U.S. PATENT DOCUMENTS

| | | |
|---|---|---|
| 3,468,548 A | 9/1969 | Webb |
| 3,499,653 A | 3/1970 | Gardner |
| 3,558,238 A | 1/1971 | Van Herpt |
| 3,704,019 A | 11/1972 | McHugh |
| 3,746,350 A | 7/1973 | Mayer et al. |
| 3,804,424 A | 4/1974 | Gardner |
| 3,917,289 A | 11/1975 | Ivanov et al. |
| 3,937,477 A | 2/1976 | Gyory |
| 3,941,395 A * | 3/1976 | Ball et al. ............... 277/369 |
| 3,968,969 A | 7/1976 | Mayer et al. |
| 4,084,825 A * | 4/1978 | Ludwig ............... 277/348 |
| 4,212,475 A | 7/1980 | Sedy |
| 4,243,230 A | 1/1981 | Baker et al |
| 4,406,466 A | 9/1983 | Geary, Jr. |
| 4,461,487 A | 7/1984 | Matsumoto |
| 4,523,764 A | 6/1985 | Albers et al. |
| 4,545,588 A | 10/1985 | Nagai et al. |
| 4,586,717 A * | 5/1986 | Sweeney ............... 277/348 |
| 4,621,981 A * | 11/1986 | Lorett ............... 210/787 |
| 5,133,562 A | 7/1992 | Lipschitz |
| 5,238,253 A * | 8/1993 | Sieghartner ............ 277/361 |
| 5,375,853 A | 12/1994 | Wasser et al. |
| 5,503,407 A | 4/1996 | McNickle |
| 5,951,020 A * | 9/1999 | Orlowski ............... 277/419 |

* cited by examiner

Primary Examiner—Robert J. Sandy
Assistant Examiner—Vishal Patel
(74) Attorney, Agent, or Firm—Marvin E. Jacobs

(57) ABSTRACT

A sealing assembly for a rotatable shaft, comprising means to generate pressure differentials and temperature through pumping action and means to seal fluid, for example of the non-contact helical groove type. Sealing means are positioned outboard of pumping means. Fluid in liquid form is heated and depressurized on passage through pumping means of vortex or viscous shear type, thereby changed from liquid to gas. Gasified fluid is then sealed by sealing means for low leakage operation.

5 Claims, 2 Drawing Sheets

ROTARY SEALING ASSEMBLY

TECHNICAL FIELD

The invention relates to sealing devices for rotating shafts where sealed fluid is employed to generate hydrostatic and hydrodynamic lift-off forces between stationary and rotating sealing elements, thereby effecting their separation and providing non-contact operation.

BACKGROUND OF THE INVENTION

A sealing assembly of a non-contact type for rotating shafts is used in high speed and high pressure applications, where contacting type seals would experience overheating problems and failures caused by generation of excessive frictional heat. Contacting seals have pressure and speed limits depending primarily on whether the sealed fluid is liquid or gas. These limits are substantially lower with gas than with liquid, because as opposed to gas, liquid lubricates the opposed, rubbing surfaces of the sealing interface and can therefore expel a considerable amount of contact heat from said interface, hence permitting higher speeds and pressures.

Non-contact seals which are the subject to this invention, will also have speed and pressure limits. However, in the absence of contact, these limits are usually not because of frictional heat at the sealing interface, but moreover due to other factors such as material strength, viscous shear heat or permissible leakage value. The limits for non-contact seals are much higher than with contacting seals. Consequently, non-contact seals offer a preferred sealing solution for high speed, high pressure applications employed in centrifugal gas compressors, light-hydrocarbon pumps, boiler feed pumps, steam turbines and the like.

Non-contact seals are commonly more able to operate at elevated speeds and pressures regardless of whether the sealed fluid is a liquid, a gas or even a mixture of liquid and gas. Particularly, when sealed fluid change phase from gas to liquid and back, said seals offer an appreciable advantage. One of such non-contacting seals is of the face type, where one of the sealing surfaces is furnished with partial helical grooves as disclosed in U.S. Pat. Nos. 4,212,475, 3,704,019 or 3,499,653. This kind of seal has been applied to several sealing situations where not only high speeds and pressures were concerned but also in applications in which gas, liquid, or gas-liquid mixtures have been handled.

A disadvantage associated with sealing with non-contact seals is the effluvium which may be higher than the leakage expected when using a contacting seal in the same situation. This disadvantage becomes even more significant when the sealed fluid is either in liquid state of in a state of a liquid-gas mixture. This issue is associated with the fact that for the same volume of leakage, the density of liquid is several times higher than that of gas. Therefore the mass of amount leaked per unit of time will be much higher when leaking fluid is in liquid form rather than when it is in gaseous form. When sealing fluids at prominent pressure and speeds, the task is comparatively easier, if the sealed fluid is already in a gaseous state. If it is not and the sealed fluid is in liquid state, then there is always an inherent probability of high leakage.

From the above discussion, it could be concluded that vaporization at the seal faces of a contacting seal might offer a benefit since there would still be an abundance of liquid around the seal to entirely dissipate any frictional heat. However, in the prior art sealing arrangements it is not common to have the fluid change its phase from liquid to gas within the seal itself. As a matter of fact, gasification or vaporization at the sealing interface is though to be destructive to seal faces of liquid seals and it is therefore perpetually suppressed by the employment of flushing or cooling arrangements.

One such prior patent is U.S. Pat. No. 3,746,350 where a vortex type axial flow pumping device is employed to maintain an all liquid condition at the seal to extract frictional heat from the seal through liquid circulation. This heat removal lowers the temperature at the seal which then depresses the vapor pressure of the sealed liquid. Therewith, vapor pressure is kept safely below the pressure at the seal thus preventing liquid to vaporize. The pumping device operates by propelling liquid in an axial direction by vortex-forming threads shaped on the external surface of the rotatable part and on the internal surface of the surrounding non-rotatable part. The binary threads have opposite hands pending on direction of rotation, liquid will thereupon be urged in one of the two axial directions. Thread profile is optimized to achieve maximum flow rate of the liquid with given speeds of rotation.

A further prior patent is U.S. Pat. No. 4,243,230. Once more a pumping device is used to generate fluid pressure, which opposes loss of fluid from the housing during shaft rotation and which disengages the face seal to avoid loss of friction energy and to reduce wear. In this case, thread profile will not be optimized for maximum flow as in previously discussed patent, but instead will be optimized for maximum pressure differential toward the condition of zero or near zero flow, and this will normally result in a different thread profile.

STATEMENT OF THE INVENTION

In accordance with the invention, a seal arrangement is formed via combination of a non-contact seal and an axial flow pumping device. Said arrangement provides low-leakage performance of that of a gas seal even if sealed fluid is not a gas but rather a liquid or a gas-liquid mixture. This is accomplished by an axial flow pumping ring segment which is arranged to pump fluid away from the non-contact seal and back towards the source of said fluid. Thus without further replenishment of fluid flow through the axial flow pumping device will stall and a pressure drop is initiated. Subsequently, when fluid is stalled cooling is curbed and temperature of the fluid will rise. Both effects pressure drop and temperature rise cause vaporization of the fluid providing a non-contact gas seal with fluid in the preferred gaseous form for low leakage operation.

The prior patents discussed above present examples where pumping means inboard the sealing means are either employed to cool and circulate fluid or to seal, fluid and disengage a contacting seal. The invention exploits pumping means inboard sealing means to resolve the problem of high leakage on elevated pressure and speed seals for liquids where vaporization occurs within pumping means rather than having vaporization at the sealing faces which is oftentimes destructive. In that way, sealing means will encounter only gaseous vapor for low leakage operation.

The basic differences between this invention and the prior patents are:

As opposed to U.S. Pat. Nos. 4,212,475, 3,704,019 or 3,499,653 the present invention will result in low leakage regardless of whether seal fluid is liquid, gas or a mixture of both., whereas the above prior art will result in low leakage only if sealed fluid is a gas with liquid or liquid-gas mixture leakage will be higher.

This invention enhances vaporization by restricting circulation of pumped liquid to heat it and depressurize it. On the other hand, working with liquid only the seal of U.S. Pat. No. 3,746,350 suppresses vaporization by minimizing restriction to pumped liquid flow and channeling this flow through a cooling system and back to the seal.

The present invention uses a pressure drop optimized pumping device to vaporize the liquid while prior art uses pressure drop optimized pumping device to move a sealing subassembly in axial direction.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
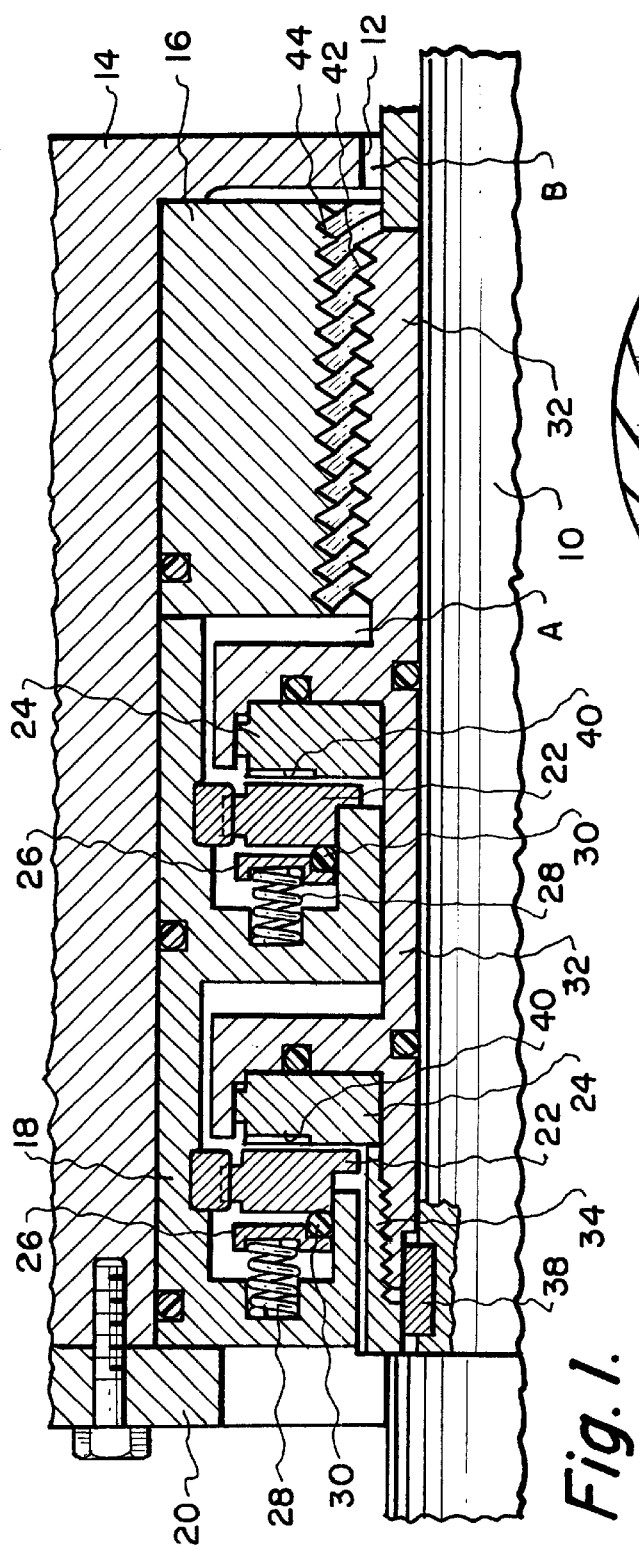
FIG. 1 is a side view in section of a selected tandem seal assembly.

Referring now to FIG. 1, a first embodiment of my invention comprises a shaft 10, rotatable within the cylindrical bore 12 of a housing 14. Bore 12 steps up concentrically within housing 14 to receive a non-rotatable pumping ring 16 and a seal retainer 18. A cover plate 20 is secured to the housing 14 locking both the pumping ring 16 and the seal retainer 18 in axial position relative to the shaft 10. The housing 14 may be mounted on a support (not shown). A stationary sealing ring 22 is urged against a rotatable sealing ring 24 by a spring disc 26, pushed axially via a plurality of springs 28. An O-ring 30 is positioned between the stationary sealing ring 22 and the spring disc 26. The rotatable sealing ring 24 is seated in a drive sleeve 32 and locked by means of a clamp sleeve 34. The drive sleeve 32 and the clamp sleeve 34 together form a rotating seal assembly prevented from rotation relative to shaft 10 by means of a key 38. For non-contact, hydrodynamic operation the rotatable sealing ring 24 is provided with plurality of partial helical grooves 40, shown in the sealing face shown on FIG. 2 with geometry differing depending on shaft rotation, sealed pressure and other variables. The drive sleeve 32 is provided with an external thread 42 which when optimized for maximum pressure differential will usually have a triangular shape in axial section.

The non-rotatable pumping ring 16 is provided with an internal thread 44 which is of the opposite hand to that of the thread 42 and also usually triangular for maximum pressure. Depending on the direction of rotation of the shaft 10, one of these threads will have a right-hand direction while the other will have a left-hand direction. The section of drive sleeve 32 with thread 42 is concentrically positioned within the threaded section of thread 44 of the non-rotatable pumping ring 16. Though both threads are separated by a small clearance, they are largely exaggerated for clarity on FIG. 1. The clearance is minimized for maximum pressure differential. During operation, the threads 42 and 44 propel liquid away from the sealing rings 22 and 24 and towards the source of liquid pressure at bore 12 to remove liquid from around the seal and leave said sealing rings surrounded by gaseous fluid for low leakage operation.

Figure 2:
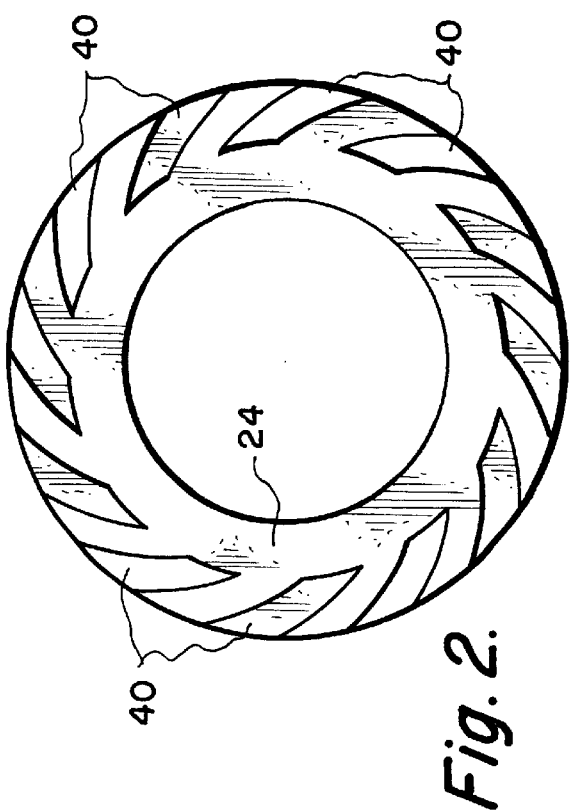
FIG. 2 is a front view in elevation showing a sealing face detail.

FIG. 2 illustrates the helical grooved end face of the rotatable sealing ring 24 in FIG. 1 showing the contour of grooves 40, each of which starts at the outer circumference of the ring 24 extending inward and ending at a diameter larger than that of the inner circumference. All the helical grooves 40 are identical in their contours.

Figure 3:
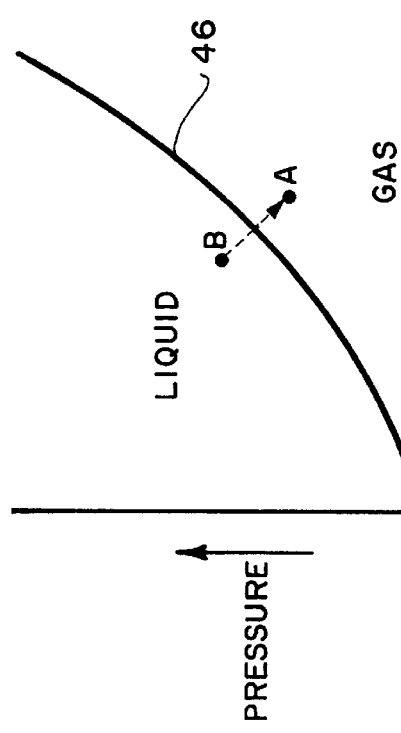
FIG. 3 is a pressure-temperature chart showing a section of a typical vapor pressure curve of a fluid.

FIG. 3 is a graph of a section of the vapor pressure curve for a typical fluid with temperature bar on the horizontal axis and vapor pressure bar on the vertical axis. The curve 46 connects all points on the graph where fluid can be in either gas or liquid state. The region above curve 46 designated with the word "LIQUID" shows the region of pressure-temperature combination, where fluid can only be in liquid state. The region below curve 46 identified by the word "GAS" shows the region where fluid can only be in gaseous state.

Points A and B in FIG. 3 also appear on FIG. 1 and correspond to the pressure drop and temperature rise on the pumping device between threads 42 and 44 of FIG. 1 and illustrates the changes in the condition at respective axial ends of said threads from condition B of liquid state to condition A of gaseous state. It should be noted, that in order for liquid-gas state transition to take place, point B has to be sufficiently close to curvature 46 for the particular geometry of pumping threads and the rotational speed of the shaft, so that with given pressure drop and fluid heatup point A will remain in gaseous region of the chart and liquid will indeed vaporize.

Figure 4:
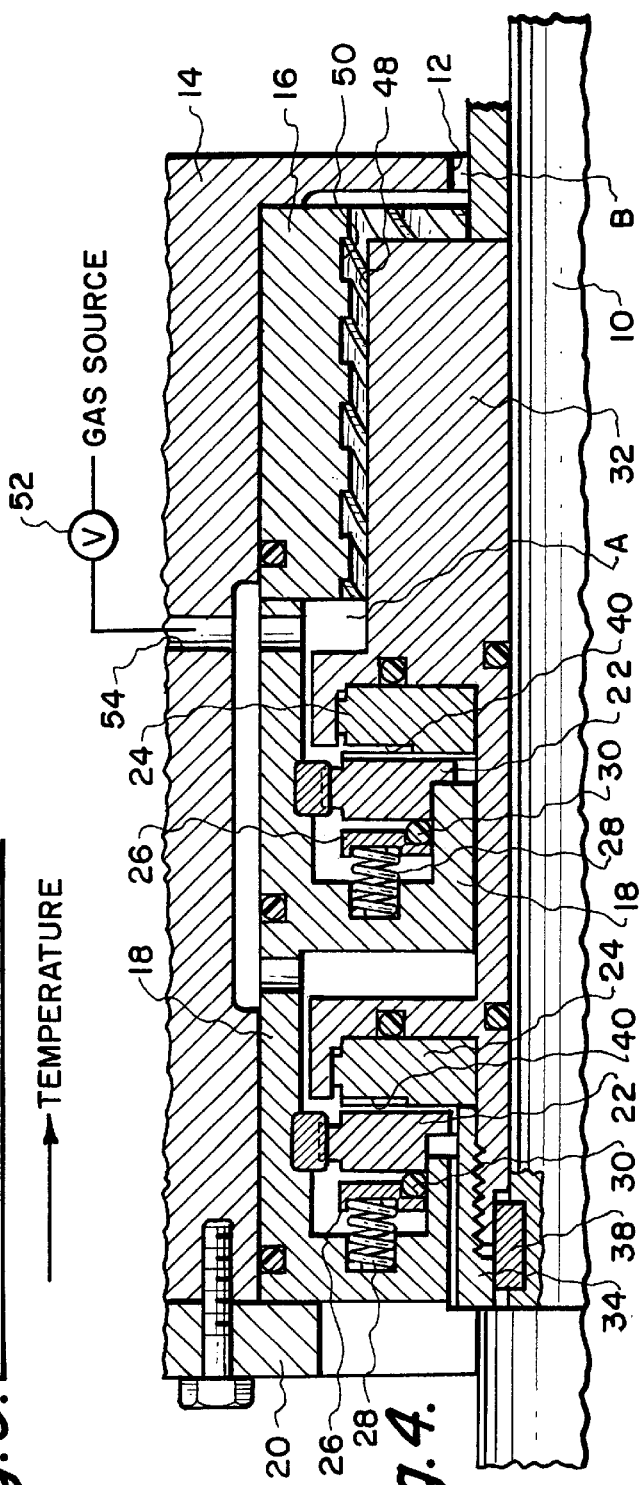
FIG. 4 is a side view in section of another embodiment of the invention.

FIG. 4 illustrates another embodiment of the invention similar to the one shown in FIG. 1 except for the pumping thread configuration. While the pumping device in FIG. 1 is based on a vortex-generating action, pumping device in FIG. 4 is based on viscosity effects and is utilized in sealing arrangements similar to those known as VISCOSEALS.

The sealing assembly of FIG. 4 uses a combination of smooth outer surface 48 of drive sleeve 32 and of a shallow rectangular thread profile 50 of non-rotatable pumping ring 16, even though other profile configurations exist and are effective. Also shown in FIG. 4 is an optional inlet 54 for a gas such as air at atmospheric pressure through a one-way valve 52. The purpose of this inlet is to prevent pressure on the seal from dropping below atmospheric pressure at conditions of start-up and before temperature reaches operating levels high enough to produce sufficient quantities of gas phase. Should seal fluid be such that mixing it with air is not permitted, the gas supplied at inlet 52 can be obtained from an external source.

It is to be realized that only preferred embodiments of the invention have been described and that numerous substitutions, modifications and alterations are permissible without departing from the spirit and scope of the invention as defined in the following claims.

What is claimed is:

1. A shaft sealing assembly with a pumping device for sealing a fluid at a space between a housing and a rotatable shaft, the shaft sealing assembly comprising:

a seal ring unit, coaxially surrounding said shaft within said housing and arranged for movement axially relative to said shaft under a resilient pressure;

counter ring unit, coaxially surrounding said shaft within said housing and prevented from axial movement relative to said shaft when in operating position;

each of said ring units having an end face for mutual engagement under said resilient pressure to form a seal, one of said ring units being mounted for rotation with said shaft at least one of said end faces having a surface profile to act on a sealed fluid between said end faces; and a pumping means, positioned concentrically with said shaft and concentrically within said housing and positioned between said space and said sealing means for vaporizing a liquid portion of said fluid, said pumping means comprising a threaded internal or external cylindrical surface of a member.

2. A sealing assembly according to claim 1 where said pumping means comprises a threaded external cylindrical surface of a member mounted for rotation with said shaft.

3. A sealing assembly according to claim 1 where said pumping means comprises a threaded internal cylindrical surface of a member mounted for rotation with said shaft.

4. A sealing assembly according to claim 1 where said surface profile on one of said end faces is a plurality of helical grooves.

5. A sealing assembly according to claim 1 where said housing comprises a port near said sealing means, said port connected to communicate with an external gas source by means of a one-way valve, said valve preventing outflow of said sealed fluid.

* * * * *